(12) United States Patent
Jette

(10) Patent No.: US 6,926,236 B2
(45) Date of Patent: Aug. 9, 2005

(54) CABLE TRAY APPARATUS AND METHOD

(76) Inventor: Roger Jette, 38 W. Islip Rd., West Islip, NY (US) 11795

( * ) Notice: Subject to any disclaimer, the term of this patent is extended or adjusted under 35 U.S.C. 154(b) by 0 days.

(21) Appl. No.: 10/378,509

(22) Filed: Mar. 3, 2003

(65) Prior Publication Data
US 2003/0178535 A1 Sep. 25, 2003

Related U.S. Application Data (60) Provisional application No. 60/361,437, filed on Mar. 4, 2002.

(51) Int. Cl.$^7$ .................................................. F16L 3/22
(52) U.S. Cl. .......................................... 248/68.1; 248/65
(58) Field of Search .......................... 248/68.1, 49, 53, 248/302, 318, 692, 690, 65, 211, 215; 211/49.1, 126.9, 133.5, 194; 174/50.6, 52.4, 68.3

(56) References Cited

U.S. PATENT DOCUMENTS

| | | | | |
|---|---|---|---|---|
| 1,590,910 A | | 6/1926 | Rumril | 237/280.5 |
| 1,787,106 A | | 12/1930 | Glazener | 248/75 |
| 2,082,099 A | | 6/1937 | Cruser | 248/49 |
| 2,620,232 A | | 12/1952 | King | 299/65 |
| 2,684,512 A | | 7/1954 | Beman | 24/26 |
| 2,687,329 A | | 8/1954 | Hunter | 299/104 |
| 2,891,750 A | | 6/1959 | Bergquist | 248/58 |
| 3,021,102 A | * | 2/1962 | Kuempel | 248/49 |
| 3,053,358 A | | 9/1962 | Gross | 189/36 |
| 3,321,571 A | | 5/1967 | Lynch | 174/101 |
| 3,363,048 A | * | 1/1968 | Vaughn | 174/72 A |

(Continued)

FOREIGN PATENT DOCUMENTS

| | | | |
|---|---|---|---|
| DE | 1 540 323 | 2/1970 | H02G/19/05 |
| DE | 1 615 074 | 4/1970 | H02G/19/05 |
| DE | 2 155 625 | 5/1973 | F16L/3/24 |
| DE | 2 358 863 | 11/1973 | H02G/3/28 |
| DE | 2 358 863 | 5/1974 | H02G/3/28 |
| DE | 3 742 448 | 6/1989 | H02G/3/04 |
| EP | 0 298 825 | 1/1989 | H02G/3/04 |
| EP | 0 553 039 | 7/1993 | F16L/3/22 |
| EP | 0 556 137 | 8/1993 | F16L/3/22 |
| EP | 0 571 307 | 11/1993 | H02G/3/06 |
| FR | 2 395 449 | 1/1979 | F16L/3/00 |

Primary Examiner—Anita King
Assistant Examiner—A. Joseph Wujciak
(74) Attorney, Agent, or Firm—Carter, DeLuca, Farrell & Schmidt, LLP.

(57) ABSTRACT

A cable tray apparatus for use with a ladder-type cable tray having a pair of parallel spaced apart rails interconnected by a plurality of rungs is disclosed. The cable tray apparatus includes an elongate flexible spine member selectively bendable into a number of different configurations, and a plurality of spaced apart hangers attached to the elongate spine member along the length thereof, each of the plurality of hangers defining a partially enclosed area configured and dimensioned to receive at least one cable therein, wherein each of the plurality of hangers includes a support bracket integrally formed therewith for removably attaching the hanger to at least one of the pair of spaced apart rails of the ladder-type cable tray. The present disclosure also relates to methods of using the cable tray subassemblies disclosed herein in conjunction with ladder-type cable trays.

23 Claims, 6 Drawing Sheets

U.S. PATENT DOCUMENTS

| | | | |
|---|---|---|---|
| 3,588,012 A | 6/1971 | Schaefer | 248/80 |
| 3,687,406 A | 8/1972 | Krahe et al. | 248/55 |
| 4,068,824 A | 1/1978 | Flynn | 254/124 |
| 4,143,845 A | 3/1979 | Harris | 248/221.2 |
| 4,156,436 A | 5/1979 | Hawk | 137/344 |
| 4,337,934 A | 7/1982 | Caveney | 269/77 |
| 4,372,510 A | 2/1983 | Skypala | 248/58 |
| 4,432,519 A | 2/1984 | Wright | 248/49 |
| 4,596,095 A | 6/1986 | Chalfant | 52/126.6 |
| 4,765,576 A | 8/1988 | Peled | 248/49 |
| 4,840,023 A | 6/1989 | Borsani | 59/78.1 |
| 5,123,618 A | 6/1992 | Guterman et al. | 248/49 |
| 5,240,209 A | 8/1993 | Kutsch | 248/49 |
| 5,323,988 A | 6/1994 | Handler | 248/49 |
| 5,465,929 A | 11/1995 | Dooley | 248/681 |
| 5,477,649 A | 12/1995 | Bessert | 52/263 |
| 5,524,327 A | 6/1996 | Mickel et al. | 24/115 A |
| 5,531,410 A | 7/1996 | Simon | 248/49 |
| 5,548,932 A | 8/1996 | Mead | 52/126.6 |
| 5,580,014 A | 12/1996 | Rinderer | 248/49 |
| 5,704,571 A | 1/1998 | Vargo | 248/58 |
| D394,179 S * | 5/1998 | Panossian | D6/566 |
| 5,839,702 A * | 11/1998 | Jette | 248/49 |
| D405,682 S * | 2/1999 | Suher | D8/370 |
| 6,019,323 A * | 2/2000 | Jette | 248/49 |
| D427,824 S * | 7/2000 | Osburn et al. | D6/511 |
| 6,198,047 B1 * | 3/2001 | Barr | 174/68.3 |
| 6,252,171 B1 | 6/2001 | Barr | 174/95 |
| 6,313,405 B1 | 11/2001 | Rinderer | 174/68.2 |
| 6,361,000 B1 | 3/2002 | Jette | 248/49 |
| 6,364,255 B1 * | 4/2002 | Carrick et al. | 248/49 |
| 6,460,812 B1 | 10/2002 | Jette | 248/49 |
| 6,483,025 B1 * | 11/2002 | Samsi et al. | 174/48 |
| 2001/0007341 A1 * | 7/2001 | Jette | 248/49 |
| 2002/0145084 A1 * | 10/2002 | Handler | 248/58 |

\* cited by examiner

CABLE TRAY APPARATUS AND METHOD

CROSS-REFERENCE TO RELATED APPLICATION

The present application claims the benefit of and priority to U.S. Provisional Patent Application Ser. No. 60/361,437 filed on Mar. 4, 2002, the entire contents of which are incorporated herein by reference.

BACKGROUND

1. Technical Field

The present disclosure relates to a cable tray apparatus and, more particularly, to a cable tray apparatus for attachment to separate structural members, for example, a ladder-type cable tray. The present disclosure also relates to methods of using the cable tray subassemblies disclosed herein in conjunction with separate structural members, such as ladder-type cable trays.

2. Background of Related Art

Conventional ladder-type cable trays generally include a pair of spaced apart parallel and/or concentric side rails and a series of spaced apart rungs typically extending transversely between the rails for cradling cables, wiring, tubes and the like, such as for computer networks, telecommunications and the like. Ladder-type cable trays normally are suspended from ceilings on rods. In computer network installations, ladder-type cable trays are used for routing network cables along the ceiling of a dedicated room to upright components known as racks.

A typical ladder-type cable-tray in accordance with the general state of the art is disclosed in U.S. Pat. No. 6,313,405 to Rinderer, the entire content of which is incorporated herein by reference. As seen in present FIG. 1, a ladder-type cable tray, in accordance with Rinderer, is generally illustrated as (20) and includes first and second generally parallel side rails (22) and a plurality of spaced apart rungs (26) secured to and extending generally transversely between the side rails (22). Moreover, as seen in present FIG. 2, an arcuate section of cable tray, in accordance with Rinderer, is generally designated (21) which includes a pair of curved concentric spaced apart side rails (24, 25) connected by rungs, each also designated (26).

Current applications demand greater numbers of cable runs be installed to satisfy the ever-increasing need to interconnect computer and telecommunication systems, etc. Some existing cable tray and rack systems while structurally sound cannot meet the need of routing the increased volume of cable required.

Accordingly, a need exists for a cable tray apparatus which increases the capacity of existing or new cable management installations, reduces the incidents of sag along the cable run and which provides a relatively smooth curve transition from one existing cable tray section to the next. In addition, a need exists for a cable tray apparatus which can be retrofitted to existing cable tray systems and which is relatively inexpensive and easy to install.

SUMMARY

According to one aspect of the present disclosure, a cable tray apparatus for use with a ladder-type cable tray having a pair of parallel spaced apart rails interconnected by a plurality of rungs is disclosed. The cable tray apparatus includes an elongate flexible spine member selectively bendable into a number of different configurations, and a plurality of spaced apart hangers attached to the elongate spine member along the length thereof, each of the plurality of hangers defining a partially enclosed area configured and dimensioned to receive at least one cable therein, wherein each of the plurality of hangers includes a support bracket integrally formed therewith for removably attaching the hanger to at least one of the pair of spaced apart rails of the ladder-type cable tray.

The elongate flexible spine member is bendable by hand in at least one of a vertical and a horizontal direction. The plurality hangers are arrayed along the elongate flexible spine member to define a pathway to support and direct cables.

Each hanger includes a cable support member integrally attached to the elongate flexible spine member and a pair of spokes integrally formed at either end of the cable support member. Each spoke is substantially U-shaped including a riser portion integrally connected to the end of the cable support member and a return portion integrally connected to the end of the riser portion.

It is envisioned that the support bracket is integrally connected, one each, to each free end of the return portion.

According to one embodiment, each support bracket includes a portion configured and adapted to extend below an upper surface of the rail of the ladder-type cable tray and a portion configured and adapted to be supported on top of the rail of the ladder-type cable tray. Each support bracket includes a guide member having a first leg portion integrally formed with and coaxially extending from the distal end of the return portion, a second leg portion spaced from and parallel with the first leg portion, and an interconnecting member integrally connected to and extending between the first and second leg portions. Each support bracket further includes a mounting bracket integrally connected to the distal end of the second leg portion. Each mounting bracket includes a support leg integrally formed at the distal end of the second leg portion, wherein the support leg is oriented in a direction orthogonal with respect to the support bracket, and a guide leg integrally formed at the distal end of the support leg, wherein the guide leg is oriented in a direction substantially parallel with return portion.

According to another embodiment, the support brackets enable the cable tray apparatus to be snap-fit onto the ladder-type cable tray. Each of the support brackets includes an arm integrally connected to the distal end of the return portion, the arm extending in an orthogonal direction away from the elongate spine member and in a direction substantially parallel to the cable support member, a leg integrally connected to the distal end of the arm, the leg extending in a direction orthogonal to the cable support member and parallel with the return portion, and a locking member integrally connected to the distal end of the leg, the locking member having a portion extending in a direction toward the elongate spine member. It is envisioned that a plurality of tethers extending between and releasably connected, one each, to the locking members of the plurality of hangers can be provided. Preferably, each locking member is a hook.

According to another aspect of the present disclosure, the cable tray apparatus can include an elongate spine member, and a plurality of spaced apart hangers attached to the elongate spine member along the length thereof, each of the plurality of hangers defining a partially enclosed area configured and dimensioned to receive at least one cable therein. Each of the plurality of hangers includes a cable support member having a first end and a second end, the cable support member being oriented in a direction which is substantially orthogonal to the elongate spine member, a spoke connected to each of the first end and second end of the cable support member to define a channel into which runs of cable are to be laid, each spoke includes a pair of riser portions integrally connected, one each, to the first end and the second end of the cable support member, the pair of risers oriented in a direction which is orthogonal to the cable support member and the spine member, and a pair of return portions integrally connected, one each, to the free end of each of the pair of riser portions, the pair of return portions being oriented in a direction which is substantially parallel to the pair of riser portions, and a pair of support brackets integrally connected, one each, to the free end of the pair of return portions for removably attaching each of the plurality of hangers to at least one of the pair of spaced apart rails of the ladder-type cable tray.

The present disclosure also relates to methods of using the cable tray subassemblies disclosed herein in conjunction with ladder-type cable trays.

According to one aspect of the present disclosure, a method of installing a series of cable tray subassemblies to a ladder-type cable tray having a pair of spaced apart rails interconnected by a plurality of rungs, wherein the method includes the steps of providing a plurality of cable tray subassemblies. Each cable tray apparatus includes an elongate flexible spine member selectively bendable into a number of different configurations, a plurality of spaced apart hangers attached to the elongate spine member along the length thereof, each of the plurality of hangers defining a partially enclosed area configured and dimensioned to receive at least one cable therein, wherein each of the plurality of hangers includes a support bracket integrally formed therewith for removably attaching each hanger to the pair of spaced apart rails of the ladder-type cable tray. The method further includes the step of mounting the plurality of cable tray subassemblies along the length of the ladder-type cable tray such that the support brackets are removably supported by the rails of the ladder-type cable tray.

According to a further aspect of the present disclosure, there is disclosed a cable tray apparatus for mounting to an existing cable tray structure. According to the present aspect, the cable tray apparatus includes a plurality of hangers configured and adapted to define a partially enclosed area for receiving at least one cable therein, wherein each of the plurality of hangers includes at least one mounting structure configured and dimensioned to maintain the plurality of hangers removably mounted atop the existing cable tray structure, and a connecting element configured and dimensioned to interconnect each of the plurality of hangers to one another.

The connecting element is an elongate bendable spine member extending across each of the plurality of hangers. Each of the plurality of hangers includes a cable support member oriented in a direction which is substantially orthogonal to the direction of the elongate bendable spine member. Each of the plurality of hangers includes a spoke extending from each end of the cable support member, wherein each spoke is oriented in a direction orthogonal to the elongate spine and the cable support member. Each spoke includes a mounting structure configured and dimensioned to selectively and releasably connect the cable tray apparatus atop a portion of the existing cable tray structure.

BRIEF DESCRIPTION OF THE DRAWINGS

The accompanying drawings, which are incorporated in and constitute a part of this specification, illustrate embodiments of the disclosure and, together with a general description of the embodiments given above, and the detailed description of the embodiments given below serve to explain the principles of the disclosure.

DETAILED DESCRIPTION OF PREFERRED EMBODIMENTS

Figure 1:
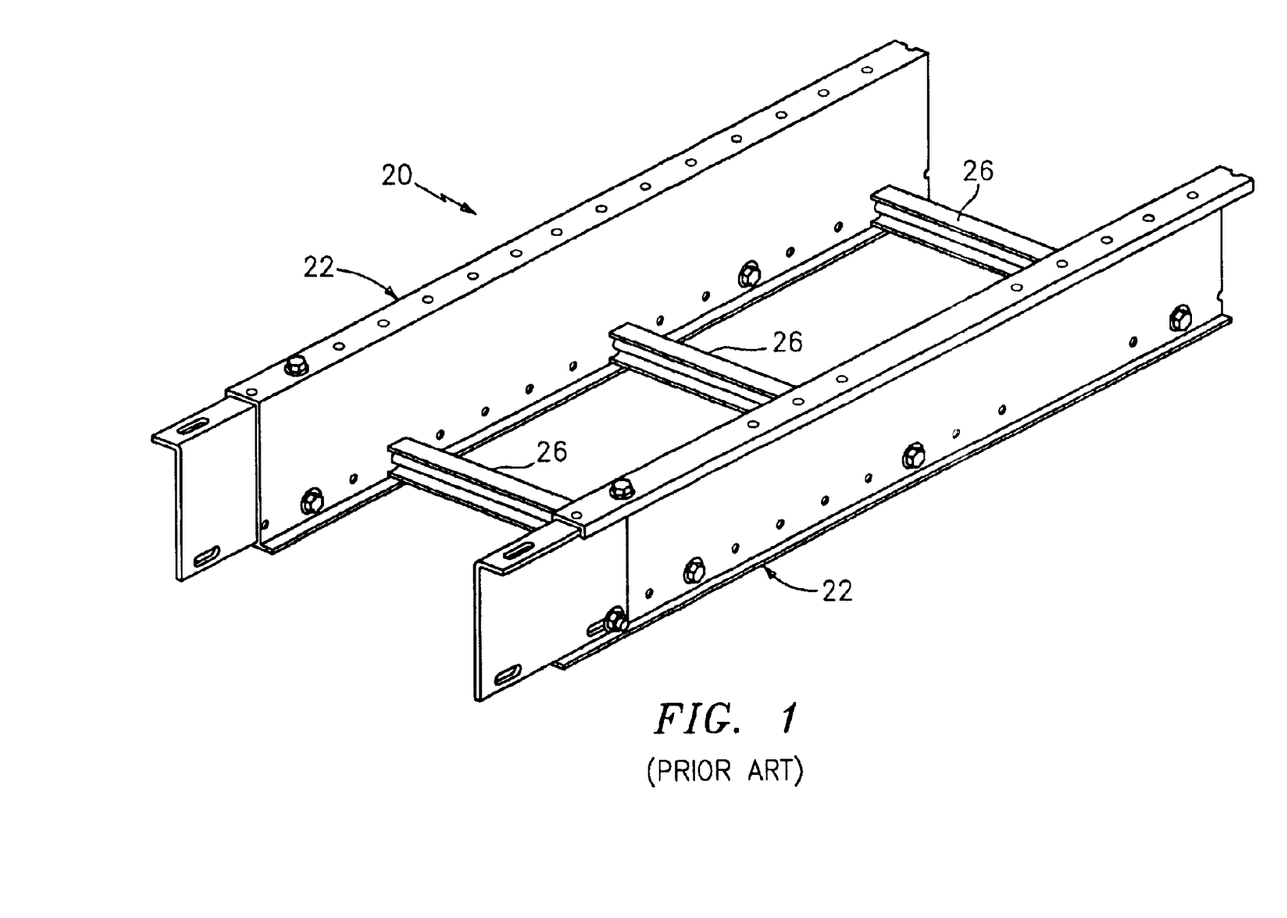
FIG. 1 is a perspective view of a straight section of cable tray in accordance with a prior art embodiment.
Figure 2:
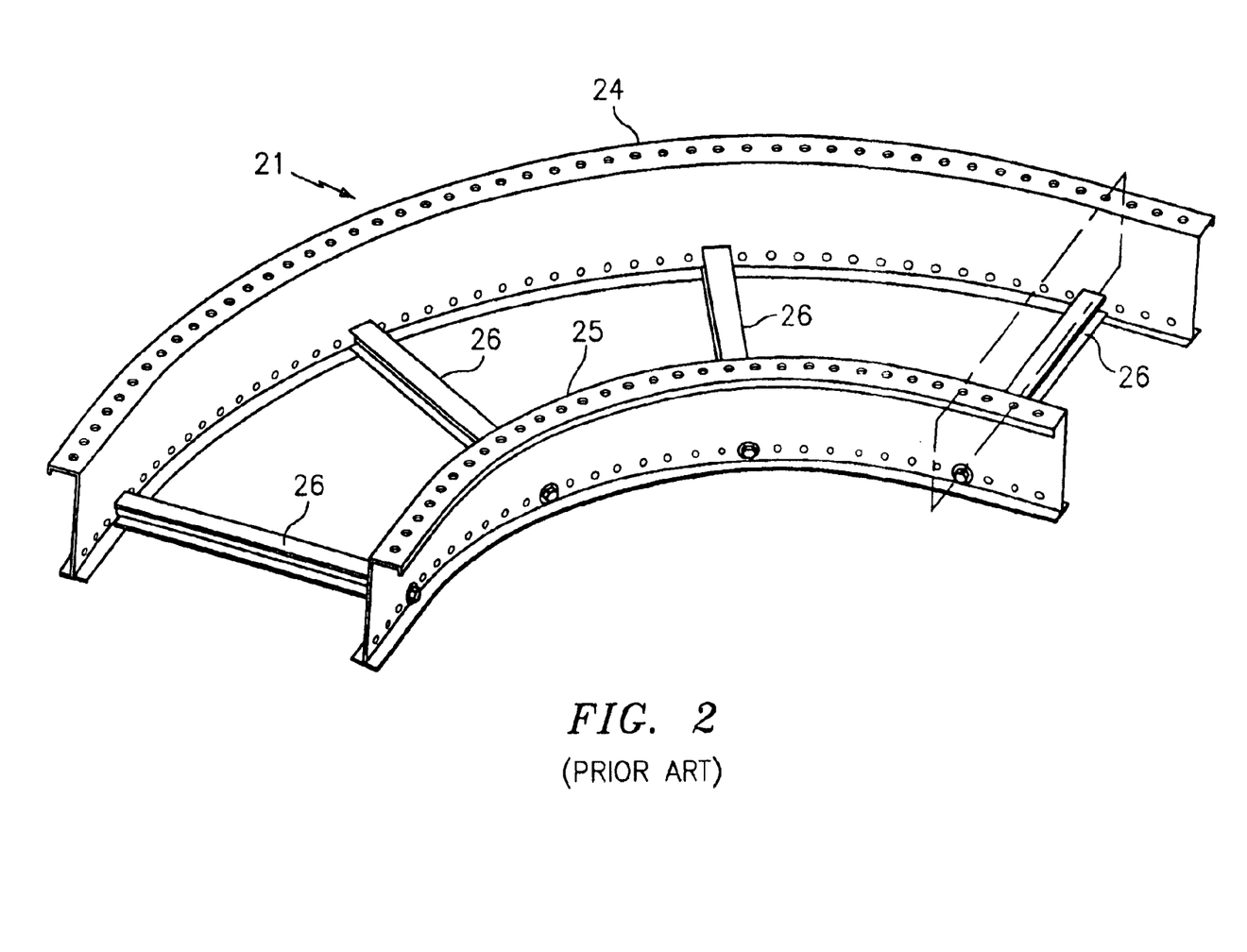
FIG. 2 is a perspective view of a curved section of cable tray in accordance with the prior art embodiment.

As seen in FIG. 1, a prior art ladder-type cable tray is generally designated as 20 and includes first and second generally parallel side rails 22 and a plurality of spaced apart rungs 26 secured to and extending generally transversely between the side rails 22. In addition, as seen in FIG. 2, a prior art arcuate section of cable tray is generally designated as 21 and includes a pair of curved concentric spaced apart side rails 24, 25 connected by rungs, each also designated 26.

Preferred embodiments of the presently disclosed cable tray apparatus will now be described in detail with reference to the drawing figures wherein like reference numerals identify similar or identical elements. Referring now in specific detail to FIGS. 3–8, and initially to FIGS. 3–7, one embodiment of a cable tray apparatus, in accordance with the present disclosure, is shown generally as 100. Cable tray apparatus 100 includes a plurality of spaced apart hangers 102 and a flexible spine 104, integral with and interconnecting each of the plurality of hangers 102. Each hanger 102 includes a cable support member 106 and a pair of U-shaped spokes 108 integrally formed at either end of cable support member 106.

Figure 3:
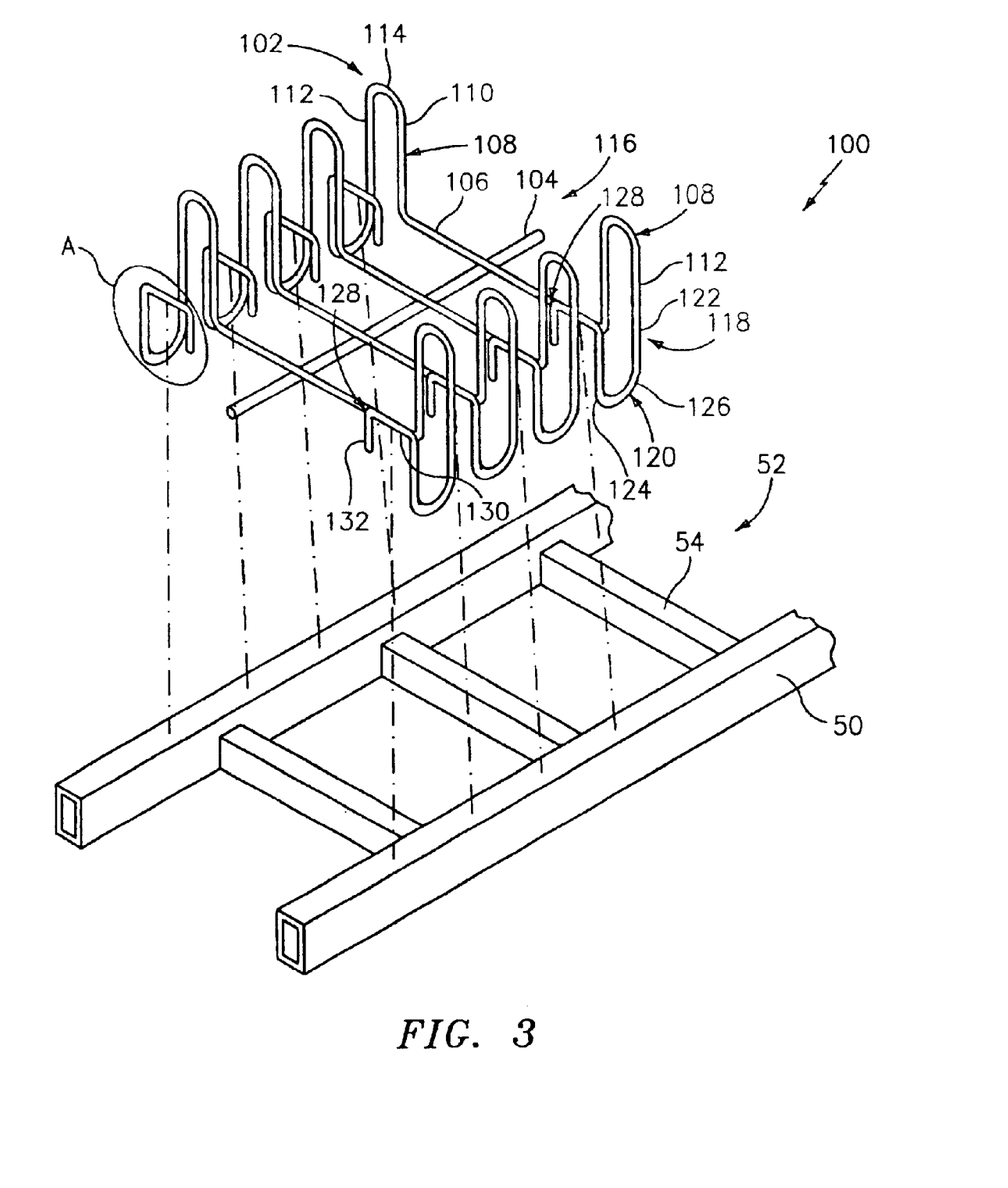
FIG. 3 is an exploded perspective view of a cable tray apparatus in accordance with the present disclosure with a prior art ladder-type cable tray shown in phantom.

Each U-shaped spoke 108 includes a riser portion 110 integrally formed at an end of cable support member 106 and a return portion 112 integrally formed with riser portion 110 via turnaround portion 114. Each U-shaped spoke 108 is oriented such that riser portion 110 and return portion 112 are substantially in the same plane as cable support member 106 and wherein each U-shaped spoke 108 is oriented substantially upward. As such, U-shaped spokes 108 define a channel or canyon 116 into which runs of cable (not shown) are to be laid.

Figure 4:
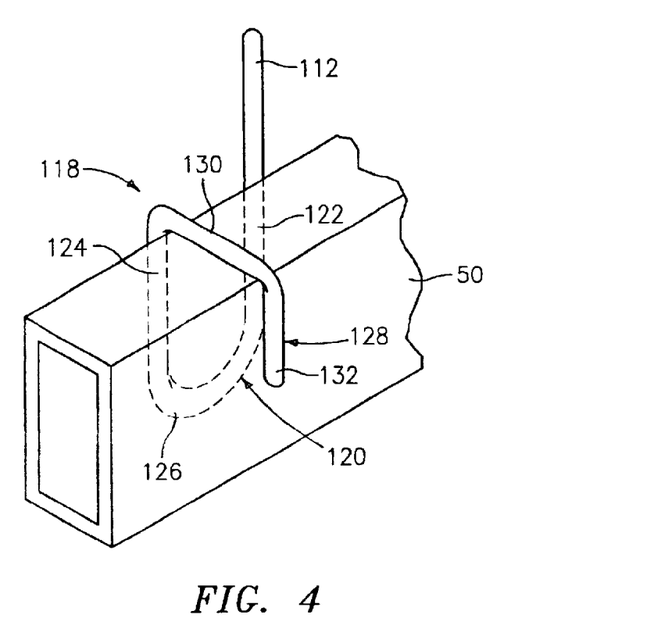
FIG. 4 is an enlarged perspective view of area "A" of FIG. 3 illustrating the support bracket for the cable tray apparatus in accordance with the present disclosure.

Each spoke 108 includes a cable tray apparatus support bracket 118. Each support bracket 118 includes a substantially U-shaped guide member 120 having a first leg 122 integrally formed with and co-axially extending from the distal end of return portion 112 of U-shaped spoke 108 and a second leg 124 integrally formed with first leg 122 via cross member 126. Preferably, each cross member 126 is oriented substantially orthogonal to the plane defined by riser portion 110 and return portion 112 of spoke 108.

Each cable tray apparatus support bracket 118 further includes a mounting bracket 128 integrally formed at the end of second leg 124 of guide member 120. Each mounting bracket 128 includes a support leg 130 integrally formed at the end of second leg 124 and a guide leg 132 integrally formed at the end of support leg 130. It is contemplated that each support leg 130 is oriented substantially parallel to cable support member 106 and directed toward flexible spine 104 while each guide leg 132 is oriented substantially parallel to riser portion 110 and return portion 112. Support legs 130 permit cable tray apparatus 100 to rest atop rails 50 of an underlying and previously installed ladder-type cable tray 52.

Figure 5:
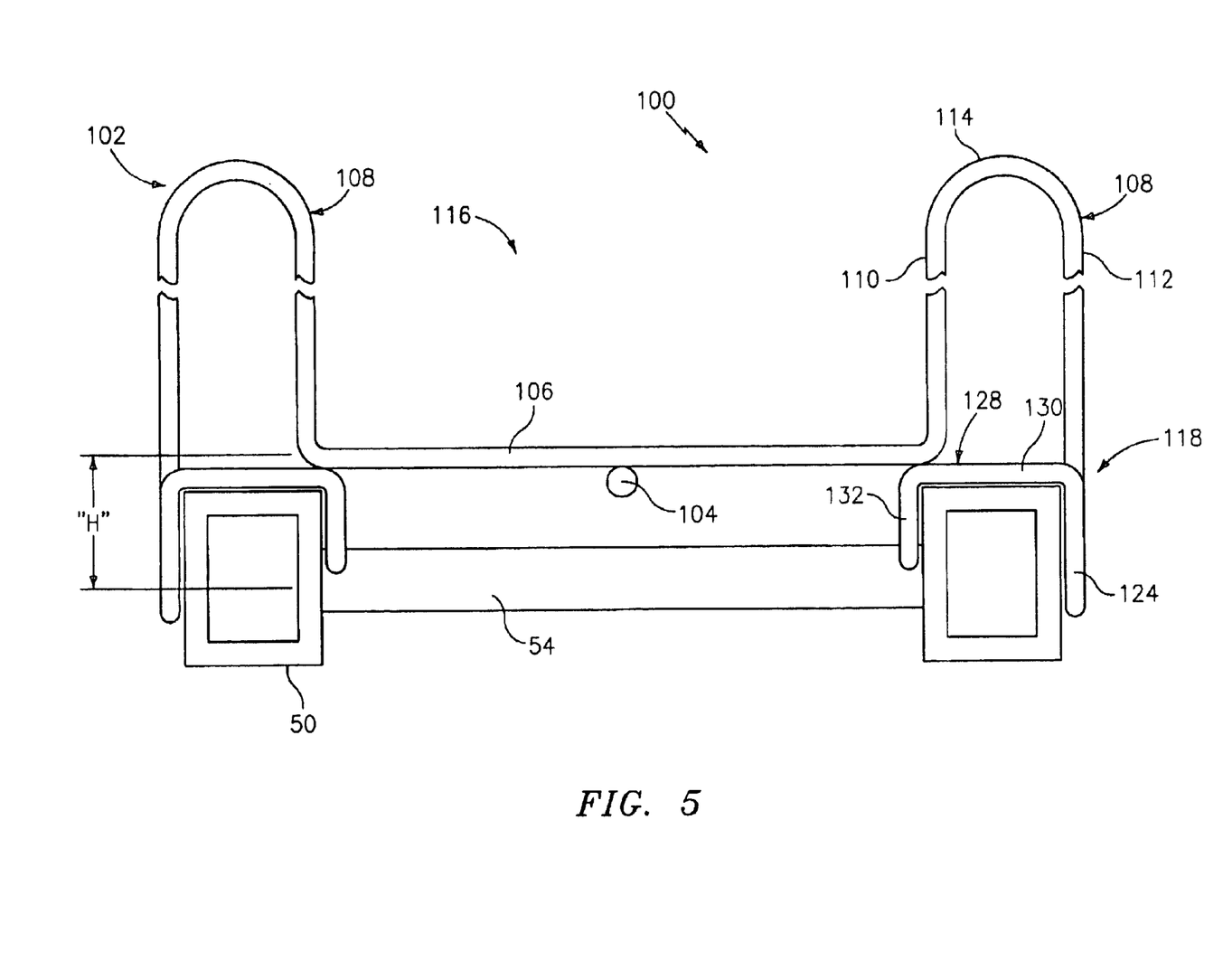
FIG. 5 is a front elevational view of the cable tray apparatus as shown in FIG. 3 mounted on to a ladder-type cable tray.

As best seen in FIG. 5, each hanger 108 preferably has a length wherein U-shaped guide members 120 are located on the outside of rails 50 and wherein guide legs 132 rest along the inside of rails 50 via support legs 130 directed substantially toward flexible spine 104. In the alternative, it is contemplated that each hanger 108 can have a length wherein U-shaped guide members 120 are located on the inside of rails 50 and guide legs 132 rest on the outside of rails 50 via support legs 130 directed substantially away from flexible spine 104.

Preferably, each support leg 130 has a length sufficient such that U-shaped guide members 120 and guide legs 132 rest on either side of rails 50 (see FIG. 5). In this manner, U-shaped guide members 120 and guide legs 132 cooperate with one another to inhibit the transverse movement of cable tray apparatus 100 relative to the underlying cable tray 52. Moreover, in accordance with the present disclosure, each hanger 102 is spaced from one another a distance which is less than the distance between adjacent rungs 54 of the underlying cable tray 52.

In use, cable tray apparatus 100 is placed atop rails 50 of an existing ladder-type cable tray system 52 and is provided with a plurality of hangers 102 which are more closely spaced to one another than the rungs 54 of the underlying cable tray 52. As such, the data transmission cables (not shown), placed within channel 116 of cable tray apparatus 100, will be supported at more points along its length, thereby reducing the potential adverse effects of cable sag on the transmission of data through the cable.

Preferably, cable tray apparatus 100 is formed of wire stock material having sufficient strength to support a plurality of cables thereon. Alternatively, cable tray apparatus 100 may be formed of any suitable material which is configured and dimensioned to support a plurality of cables thereon.

Figures 6, 7:
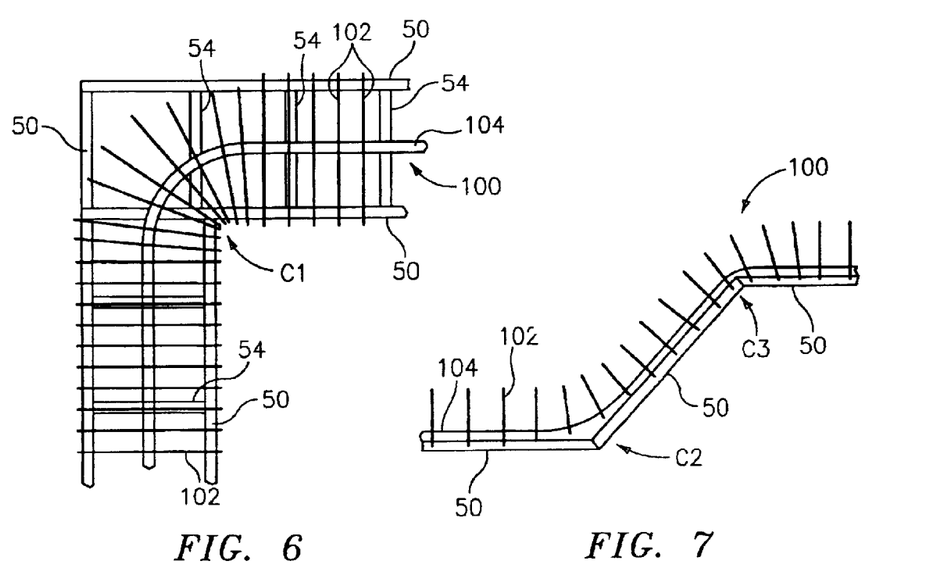
FIG. 6 is a top plan view of a typical prior art ladder-type cable tray run having a plurality of cable tray subassemblies, in accordance with the present disclosure, mounted thereto.
FIG. 7 is a side elevational view of a typical prior art ladder-type cable tray run having a plurality of cable tray subassemblies, in accordance with the present disclosure, mounted thereto.

As seen in FIG. 6, a typical layout for a cable run having to navigate a 90° turn using a prior art ladder-type cable tray 52 is shown having a cable tray apparatus 100, in accordance with the present disclosure, supported thereon. In the past, runs of cable which were laid atop ladder-type cable tray 52 had to bend around a sharp corned "C1". While corner "C1" may not have caused problems with the use of copper core cables, corner "C1" may result in data transmission losses with some of today's more sensitive cable products, i.e., the cracking or fracturing of the glass filament of a fiberoptic type cable, thus resulting in an interruption or a termination of data transmission therethrough. Moreover, the relatively large distance between adjacent rungs 54 along ladder-type cable tray 52 is reduced by the placement of cable tray apparatus 100, having relatively closely spaced adjacent hangers 102, on top of rails 50.

As seen in FIG. 7, another typical layout for cable run having to navigate either up or down a level using a prior art ladder-type cable tray 52 is shown having a cable tray apparatus 100, in accordance with the present disclosure, supported thereon. In the past, runs of cable laid atop ladder-type cable tray 52 had to bend around sharp internal corners "C2" and/or sharp external corners "C3". Once again, while corners "C2" and/or "C3" may not have caused problems with the use of copper core cables, corners "C2 and C3", may now result in data transmission losses with some of today's more sensitive cable products. For example, the cracking or fracturing of a fiberoptic type cable which is laid on ladder-type cable tray 52 might occur. However, by placing cable tray apparatus 100 atop ladder-type cable tray 52, corners "C2 and C3" are smoothed out thereby reducing the likelihood of cable damage. For example, the tendency of the glass filament of a fiberoptic type cable to crack or fracture at or near corners "C2 and/or C3".

As seen in FIG. 5, riser portion 110 and return portion 112 of U-shaped spokes 108 can have any length. In this manner the height of U-shaped spokes 108 can be varied or selected as needed. For example, if fewer cables are to be run then U-shaped spokes 108 having a reduced height is sufficient, however, if more cables are to be run then U-shaped spokes having an increased height would be necessary.

It is further envisioned that the individual lengths of riser portion 110 and return portion 112 of U-shaped spokes 108 can be varied with respect to one another so that a height "H" (between cable support members 106 of cable tray apparatus 100 and rungs 54 of ladder-type cable tray 52) can be adjusted or selected as needed. Accordingly, the existing cables (not shown) installed can remain supported by rungs 54 of ladder-type cable tray 52 while additional cable runs (not shown) can be concomitantly supported by cable support members 106 of cable tray apparatus 100. In this manner, in an existing cable tray installation, using ladder-type cable trays, cable tray apparatus 100 can be retrofit to the ladder-type cable trays in order to run cables substantially concomitantly along the existing runs of cables.

Figure 8:
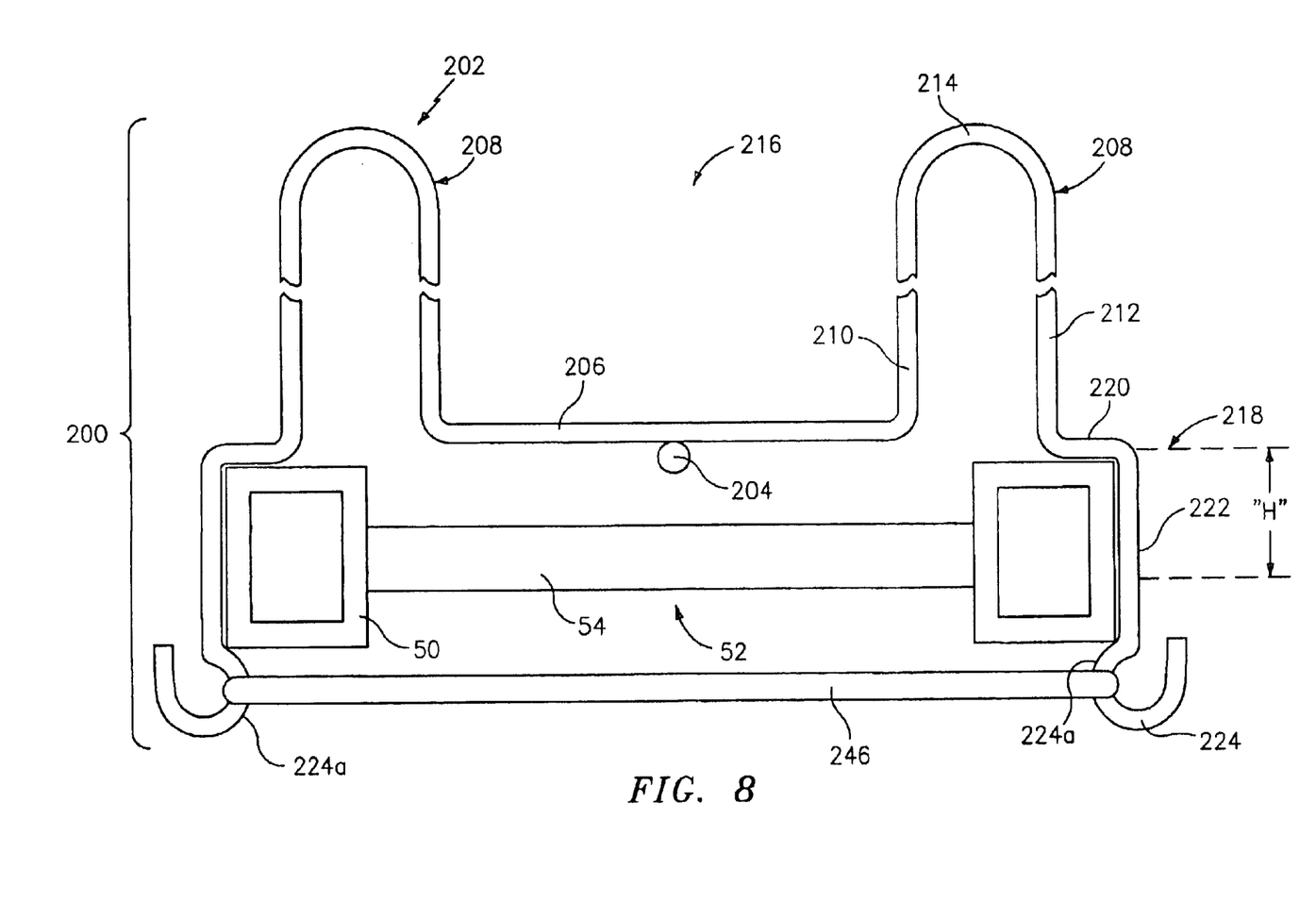
FIG. 8 is a front elevational view of an alternative embodiment of a cable tray apparatus in accordance with the present disclosure.

Referring now to FIG. 8, an alternative embodiment of a cable tray apparatus is generally shown as 200. Cable tray apparatus 200 includes a plurality of spaced apart hangers 202 and a flexible spine 204, integral with and interconnecting each of the plurality of hangers 202. Each hanger 202 includes a cable support member 206 and a pair of U-shaped spokes 208 integrally formed at either end of cable support member 206.

Each U-shaped spoke 208 includes a riser portion 210 integrally formed at an end of cable support member 206 and a return portion 212 integrally formed with riser portion 210 via turnaround portion 214. Each U-shaped spoke 208 is oriented such that riser portion 210 and return portion 212 are substantially in the same plane as cable support member 206 and wherein each U-shaped spoke 208 is oriented substantially upward. As such, U-shaped spokes 208 define a channel or canyon 216 into which runs of cable (not shown) are to be laid.

Each spoke 208 includes a cable tray apparatus support bracket 218 configured and adapted to enable cable tray apparatus 200 to be snap-fit onto the existing ladder-type cable tray. Each support bracket 218 includes an arm 220 integrally formed at a distal end of return portion 212. Each arm 220 is oriented in a direction which is orthogonal to return portion 212 and substantially parallel to cable support member 206. Each support bracket 218 further includes a leg 222 integrally formed at a distal end of a respective arm 220. Each leg 222 is oriented in a direction which is substantially parallel return portion 212. Support bracket 218 further includes a locking member 224 integrally formed at a distal end of each leg 222 and extending substantially toward flexible spine 204.

Preferably, each hanger 202 has a length such that each return portion 212 of U-shaped spoke 208 terminates short of the outer edge of rails 50 of ladder-type cable tray 52. In this manner, arms 220 define the supporting surface against which rails 50 will rest. Preferably, arms 220 extend a distance sufficient for legs 222 to contact the surface of rails 50. In addition, legs 222 preferably have a length substantially equal to the height of rails 50. In this manner, when cable tray apparatus 200 is placed atop ladder-type cable tray 52, cable tray apparatus 200 will snap fit around rails 52.

It is contemplated that each locking member 224 has a hook shape. In this manner, additional data transmission cables or in the alternative power transmission cables can be run along side the ladder-type cable tray. Preferably, each locking member 224 includes a portion 224a which extends below the outer edge of rails 50 of ladder-type cable tray 52.

Preferably, cable tray apparatus 200 is formed of wire stock material having sufficient strength to support a plurality of cables thereon. Alternatively, cable tray apparatus 200 may be formed of any suitable material which is configured and dimensioned to support a plurality of cables thereon. Preferably, cable tray apparatus 200 is formed from a material having a shape memory, such as spring steel. In this manner, when installing cable tray apparatus 200 on to ladder-type cable tray 52, return portions 212 can be temporarily deformed to create an opening larger than the outer edge of rails 50 so that locking members 224 slip over rails 50 at which time return portions 212 can be released and allowed to snap back into their original shape, thus locking onto ladder-type cable tray 52.

In the present embodiment, it is envisioned that a tether 246 can be provided which hooks onto and extends between locking member 224 of a particular hanger 208 or in between adjacent hangers 208. Tether 246 is intended to inhibit an outward deflection of return portions 212 relative to one another, which outward deflection may cause arms 220 to slip off of rails 50.

Similar to cable tray apparatus 100 shown in FIGS. 3–7, it is envisioned that the individual lengths of riser portion 210 and return portion 212 of U-shaped spokes 208 can be varied with respect to one another so that a height "H" (between cable support members 206 of cable tray apparatus 200 and rungs 54 of ladder-type cable tray 52) can be adjusted or selected as needed. In this manner, the existing cables (not shown) can remain supported by rungs 54 of ladder-type cable tray 52 while additional cables (not shown) can be concomitantly supported by cable support members 206 of cable tray apparatus 200.

While the present disclosure has been particularly shown and described with reference to the preferred embodiments thereof, it will be understood by those skilled in the art that the foregoing and other changes in form and details may be made therein without departing from the spirit and scope of the disclosure. Therefore, the above description should not be construed as limiting, but merely as exemplifications of preferred embodiments. Those skilled in the art will envision other modifications within the scope and the spirit of the present disclosure.

What is claimed is:

1. A cable tray apparatus, for use with a ladder-type cable tray having a pair of parallel spaced apart rails interconnected by a plurality of rungs, comprising:
   an elongate flexible spine member selectively bendable into a number of different configurations; and
   a plurality of spaced apart hangers attached to the elongate spine member along the length thereof, each of the plurality of hangers defining a partially enclosed area configured and dimensioned to receive at least one cable therein, wherein each of the plurality of hangers includes a support bracket integrally formed therewith for removably attaching the hanger to at least one of the pair of spaced apart rails of the ladder-type cable tray, wherein each support bracket includes:
      a first portion which is integral with the hanger, and is oriented orthogonal to the spine member; and
      a second portion which is integral with the first portion, is oriented orthogonal to the first portion, and is oriented toward the spine member.

2. The cable tray apparatus according to claim 1, wherein the elongate flexible spine member is bendable in at least one of a vertical and a horizontal direction.

3. The cable tray apparatus according to claim 1, wherein the plurality of hangers are arrayed along the elongate flexible spine member to define a pathway to support and direct cables.

4. The cable tray apparatus according to claim 1, wherein each hanger includes a cable support member integrally attached to the elongate flexible spine member and a pair of spokes integrally formed at either end of the cable support member.

5. The cable tray apparatus according to claim 4, wherein each spoke is substantially U-shaped including a riser portion integrally connected to an end of the cable support member and a return portion integrally connected to an end of the riser portion.

6. The cable tray apparatus according to claim 5, wherein each support bracket is integrally connected to a free end of a respective return portion.

7. The cable tray apparatus according to claim 6, wherein each support bracket includes a guide member having a first leg portion integrally formed with and coaxially extending from a distal end of the return portion, a second leg portion spaced from and parallel with the first leg portion, and an interconnecting member integrally connected to and extending between the first and second leg portions.

8. The cable tray apparatus according to claim 7, wherein each support bracket further includes a mounting bracket integrally connected to a distal end of the second leg portion.

9. The cable tray apparatus according to claim 8, wherein each mounting bracket includes a support leg integrally formed at the distal end of the second leg portion, wherein the support leg is oriented in a direction orthogonal with respect to the second leg portion and a guide leg integrally formed at the distal end of the support leg, wherein the guide leg is oriented in a direction substantially parallel with the return portion.

10. The cable tray apparatus according to claim 6, wherein the support brackets provide the cable tray apparatus with a snap-fit engagement with a ladder-type cable tray.

11. The cable tray apparatus according to claim 10, wherein each of the support brackets includes:
   an arm integrally connected to a distal end of the return portion, the arm extending in an orthogonal direction away from the elongate spine member and in a direction substantially parallel to the cable support member;

a leg integrally connected to a distal end of the arm, the leg extending in a direction orthogonal to the cable support member and parallel with the return portion; and a locking member integrally connected to a distal end of the leg, the locking member having a portion extending in a direction toward the elongate spine member.

12. The cable tray apparatus according to claim 11, further comprising:

a plurality of tethers extending between and releasably connected, one each, to the locking members of the plurality of hangers.

13. The cable tray apparatus according to claim 12, wherein each locking member is a hook.

14. A cable tray apparatus, for use in conjunction with a ladder-type cable tray having a pair of parallel spaced apart rails interconnected by a plurality of rungs, comprising:

an elongate spine member;

a plurality of spaced apart hangers attached to the elongate spine member along the length thereof, each of the plurality of hangers defining a partially enclosed area configured and dimensioned to receive at least one cable therein, wherein each of the plurality of hangers includes:

a cable support member having a first end and a second end, the cable support member being oriented in a direction which is substantially orthogonal to the elongate spine member, a spoke connected to each of the first end and second end of the cable support member to define a channel into which runs of cable are to be laid, each spoke includes a pair of riser portions integrally connected, one each, to the first end and the second end of the cable support member, the pair of risers oriented in a direction which is orthogonal to the cable support member and the spine member, and a pair of return portions integrally connected, one each, to a free end of each of the pair of riser portions, the pair of return portions being oriented in a direction which is substantially parallel to the pair of riser portions; and a pair of support brackets integrally connected, one each, to a free end of the pair of return portions for removably attaching each of the plurality of hangers to at least one of the pair of spaced apart rails of the ladder-type cable tray, each of the support brackets includes:

a guide member having a first leg portion integrally formed with and coaxially extending from a distal end of the return portion;

a second leg portion spaced from and parallel with the first leg portion; and an interconnecting member integrally connected to and extending between the first and second leg portions.

15. The cable tray apparatus according to claim 14, wherein each support bracket further comprises a mounting bracket integrally connected to the distal end of the second leg portion, wherein each mounting bracket includes:

a support leg integrally formed at a distal end of the second leg portion, wherein the support leg is oriented in a direction orthogonal with respect to the second leg portion; and a guide leg integrally formed at a distal end of the support leg, wherein the guide leg is oriented in a direction substantially parallel with the return portion.

16. The cable tray apparatus according to claim 14, wherein each of the support brackets includes:

an arm integrally connected to a distal end of the return portion, the arm extending in an orthogonal direction away from the elongate spine member and in a direction substantially parallel to the cable support member;

a leg integrally connected to a distal end of the arm, the leg extending in a direction orthogonal to the cable support member and parallel with the return portion; and a locking member integrally connected to a distal end of the leg, the locking member having a portion extending in a direction toward the elongate spine member.

17. The cable tray apparatus according to claim 16, further comprising:

a plurality of tethers extending between and releasably connected, one each, to the locking members of the plurality of hangers.

18. A method of installing a series of cable tray apparatus, to a cable tray having a pair of spaced apart rails interconnected by a plurality of rungs, comprising the steps of:

providing a plurality of cable tray subassemblies, each cable tray apparatus including:

an elongate flexible spine member selectively bendable into a number of different configurations;

a plurality of spaced apart hangers attached to the elongate spine member along the length thereof, each of the plurality of hangers defining a partially enclosed area configured and dimensioned to receive at least one cable therein, wherein each of the plurality of hangers includes a support bracket integrally formed therewith for removably attaching each hanger to the pair of spaced apart rails of the cable tray; and mounting the plurality of cable tray apparatus along the length of the cable tray such that the support brackets are removably supported by the rails of the cable tray.

19. In combination with a ladder-type cable tray having a pair of parallel spaced apart rails interconnected by a plurality of rungs, a cable tray apparatus comprising:

a plurality of hangers configured and adapted to define a partially enclosed area for receiving at least one cable therein, wherein each of the plurality of hangers includes at least one mounting structure configured and dimensioned to maintain the plurality of hangers removably mounted atop the pair of parallel spaced apart rails of the ladder-type cable tray; and a connecting element configured and dimensioned to interconnect each of the plurality of hangers to one another.

20. The cable tray apparatus according to claim 19, wherein the connecting element is an elongate bendable spine member extending across each of the plurality of hangers.

21. The cable tray apparatus according to claim 20, wherein each of the plurality of hangers includes a cable support member oriented in a direction which is substantially orthogonal to the direction of the elongate bendable spine member.

22. The cable tray apparatus according to claim 21, wherein each of the plurality of hangers includes a spoke extending from each end of the cable support member, wherein each spoke is oriented in a direction orthogonal to the elongate spine and the cable support member.

23. The cable tray apparatus according to claim 22, wherein each spoke includes a mounting structure configured and dimensioned to selectively and releasably connect the cable tray apparatus atop a portion of the existing cable tray structure.

* * * * *